US011514241B2

(12) United States Patent
Armitage

(10) Patent No.: US 11,514,241 B2
(45) Date of Patent: Nov. 29, 2022

(54) METHOD, APPARATUS, AND COMPUTER-READABLE MEDIUM FOR TRANSFORMING A HIERARCHICAL DOCUMENT OBJECT MODEL TO FILTER NON-RENDERED ELEMENTS

(71) Applicant: The Original Software Group Ltd, Hampshire (GB)

(72) Inventor: Christopher Colin Armitage, Hampshire (GB)

(73) Assignee: THE ORIGINAL SOFTWARE GROUP LTD, Basingstoke (GB)

( * ) Notice: Subject to any disclaimer, the term of this patent is extended or adjusted under 35 U.S.C. 154(b) by 360 days.

(21) Appl. No.: 16/862,145

(22) Filed: Apr. 29, 2020

(65) Prior Publication Data
US 2021/0342531 A1  Nov. 4, 2021

(51) Int. Cl.
*G06F 40/14*    (2020.01)
*G06F 40/205*   (2020.01)
*G06F 40/12*    (2020.01)
*G06F 16/958*   (2019.01)
*G06F 16/2455*  (2019.01)

(52) U.S. Cl.
CPC ........ *G06F 40/205* (2020.01); *G06F 16/2456* (2019.01); *G06F 16/986* (2019.01); *G06F 40/12* (2020.01); *G06F 40/14* (2020.01)

(58) Field of Classification Search
CPC .. G06F 40/205; G06F 16/2456; G06F 16/986; G06F 40/12; G06F 40/14; G06F 40/154; G06F 40/143; G06F 40/00; G06F 16/90; G06F 16/80
See application file for complete search history.

(56) References Cited

U.S. PATENT DOCUMENTS

2011/0302510 A1* 12/2011 Harrison ............... G06F 40/134
                                                      715/781
2013/0145255 A1*  6/2013 Zheng .................... G06F 16/986
                                                      715/234
2018/0004715 A1*  1/2018 Street .................... G06F 40/137

* cited by examiner

*Primary Examiner* — Sanchita Roy
(74) *Attorney, Agent, or Firm* — Barnes & Thornburg LLP

(57) ABSTRACT

An apparatus, computer-readable medium, and computer-implemented method for transforming a hierarchical document object model (DOM) to filter non-rendered elements, including parsing elements in a hierarchical DOM to identify one or more tags, any properties, and any values of the elements, removing invisible elements determined based on properties of each invisible element, each invisible element comprising an element of the DOM that is hidden from a user when the DOM is rendered, removing empty elements based on the tags of each element, each empty element comprising a tag without any associated values, identifying remaining elements of the hierarchical DOM that have parent elements that have been removed from the hierarchical DOM, and re-parenting the remaining elements to new parent elements remaining in the hierarchical DOM based on traversing the hierarchical DOM from each of the remaining elements.

21 Claims, 15 Drawing Sheets

METHOD, APPARATUS, AND COMPUTER-READABLE MEDIUM FOR TRANSFORMING A HIERARCHICAL DOCUMENT OBJECT MODEL TO FILTER NON-RENDERED ELEMENTS

BACKGROUND

HyperText Markup Language (HTML) is the standard markup language used for building web pages that are rendered in web browsers. HTML can be represented using a Document Object Model (DOM), in which a logical tree structure corresponds to a collection of elements in a particular HTML document and each element is a part of that document.

However, HTML and the corresponding DOM frequently contain numerous elements that are never actually rendered within a web page and that have no function with respect to display of the web page or interaction with the web page. For example, certain elements may be invisible, empty, or otherwise dimensioned so that they are never rendered. For non-technical users who wish to edit an HTML document or an HTML DOM, the numerous non-rendered components can complicate the process of building, editing, or creating a web site.

Accordingly, there is a need for systems and methods for transforming hierarchical DOMs to filter non-rendered elements.

DETAILED DESCRIPTION

While methods, apparatuses, and computer-readable media are described herein by way of examples and embodiments, those skilled in the art recognize that methods, apparatuses, and computer-readable media for transforming a hierarchical document object model (DOM) to filter non-rendered elements are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Applicant has discovered a method, apparatus, and computer-readable medium that transforms a DOM, such as an HTML DOM, to filter non-rendered elements. The process discovered by the Applicant allows for the detection of elements that would not be rendered, removal of those elements, and transformation of the remaining elements to ensure that the hierarchical structure and consistency of the DOM is preserved in the absence of the removed elements.

The described systems and methods enable efficient processing of hierarchical DOMs in the context of web page design and editing since all elements that do not have an impact on the web page (that are non-rendered and non-functional) are filtered from the DOM while preserving the hierarchical structure of the DOM and links between parent and child elements within the DOM.

Figure 1:
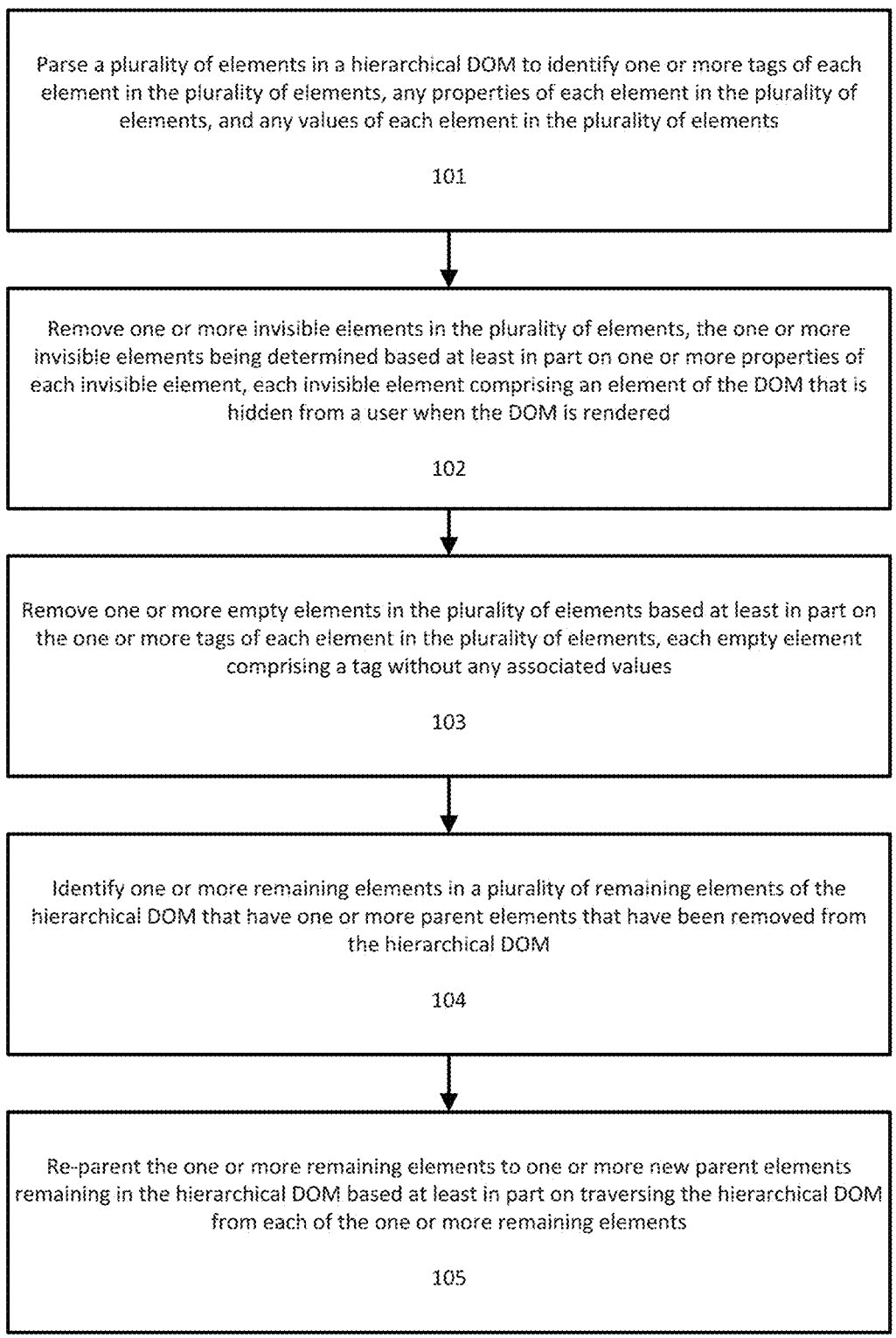
FIG. 1 illustrates a flowchart for transforming a hierarchical DOM to filter non-rendered elements according to an exemplary embodiment.

FIG. 1 illustrates a flowchart for transforming a hierarchical DOM to filter non-rendered elements according to an exemplary embodiment. As discussed above, the DOM will most commonly be an HTML DOM, although the systems and methods described herein can of course be utilized with other hierarchical DOMs.

At step 101 a plurality of elements in the hierarchical DOM are parsed to identify one or more tags of each element in the plurality of elements, any properties of each element in the plurality of elements, and any values of each element in the plurality of elements. Elements are processed through the hierarchy so that a parent element is always processed before its child elements and the child elements before the grandchild elements.

The DOM is a hierarchical collection of elements. For Chromium (a web page rendering engine) based browsers (all browsers aside from Microsoft's Internet Explorer) it is available within a browser extension. For Internet Explorer it is available within a Browser Helper Object (BHO), which is a method extending the capabilities of Internet Explorer that is specific to Microsoft.

Each element includes a tag and is an individual part of a DOM page, such as a specific HTML element in an HTML DOM. Each tag denotes the type of element that is defined by the DOM. For example, in an HTML DOM, tags can denote a title <title>, a paragraph <p>, etc.

There are 133 HTML tags currently defined by the World Wide Web Consortium (W3C) together with a further 12 that are now deprecated. It is possible to create custom HTML tags which are ignored by browsers and are similarly ignored in this process.

Additionally, some elements can have associated properties. For example, an element can have a color property (e.g., foreground color, background color), size properties, etc. Properties can be set either directly within the tag (such as the HTML tag) or inherited from a Cascading Style Sheet (CSS), which is a way to define a style for a web site that will be applied by default to all tags identified in the CSS. In addition, some properties can be dynamically created by the browser as the DOM page is rendered. For example, a rectangle on a web page that contains an element.

Elements can optionally also have values associated with them. For example, the element <body> Hello World </body> has a tag indicated it is of type "body" and a value of "Hello World." Some elements can be empty so that no value is associated with the element. As discussed further below, these elements will sometimes be marked for removal and sometimes remain unmarked, depending on the relevant context.

Figure 2:
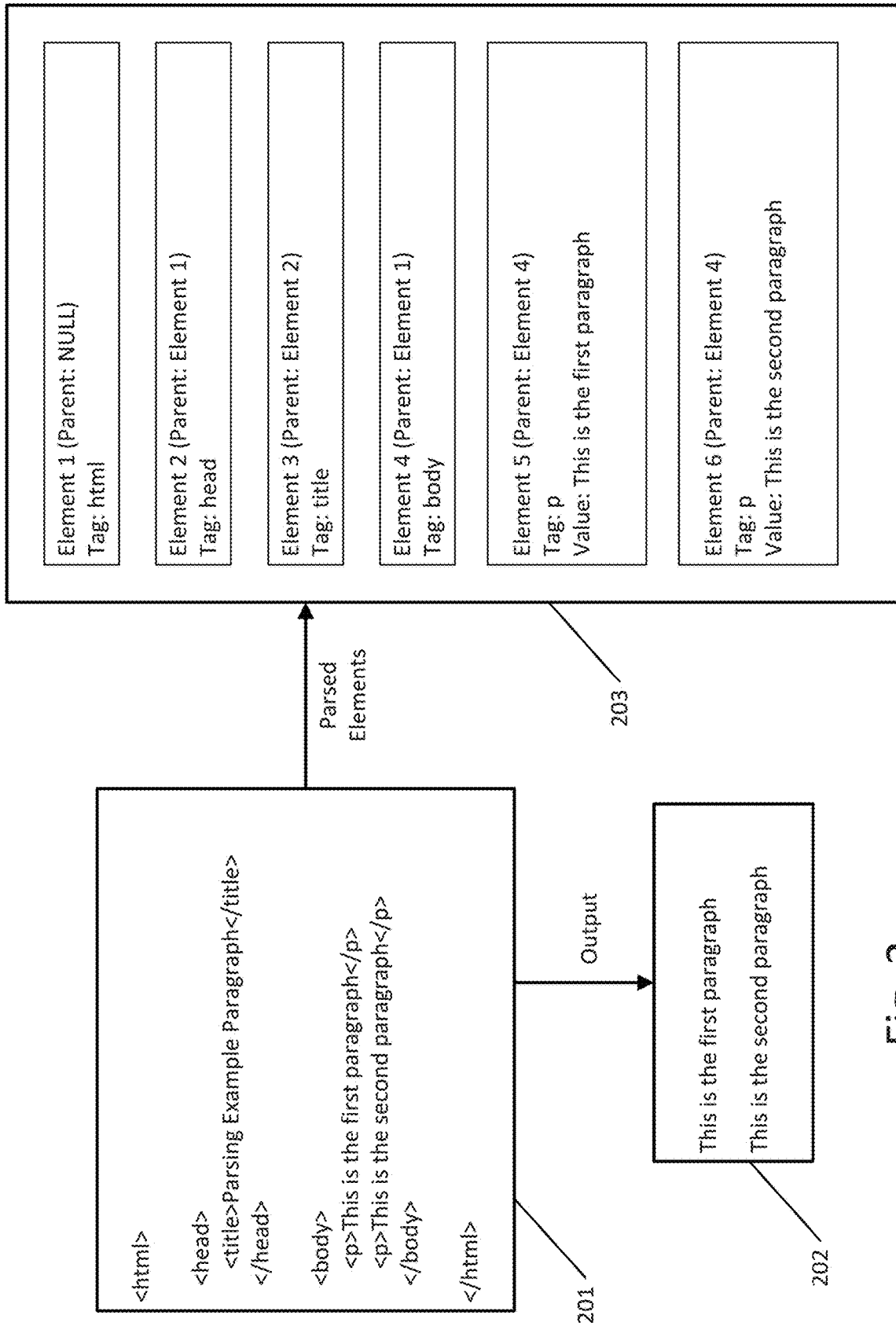
FIG. 2 illustrates an example of parsing an HTML DOM according to an exemplary embodiment.

FIG. 2 illustrates an example of parsing an HTML DOM according to an exemplary embodiment. The HTML DOM portion 201 results in output of the text shown in box 202 when the web page is rendered. Box 203 illustrates the component elements that make up the HTML DOM portion 201, and these elements can be identified as part of the parsing process, along with their corresponding tags, parent elements, and any associated values.

Figure 3:
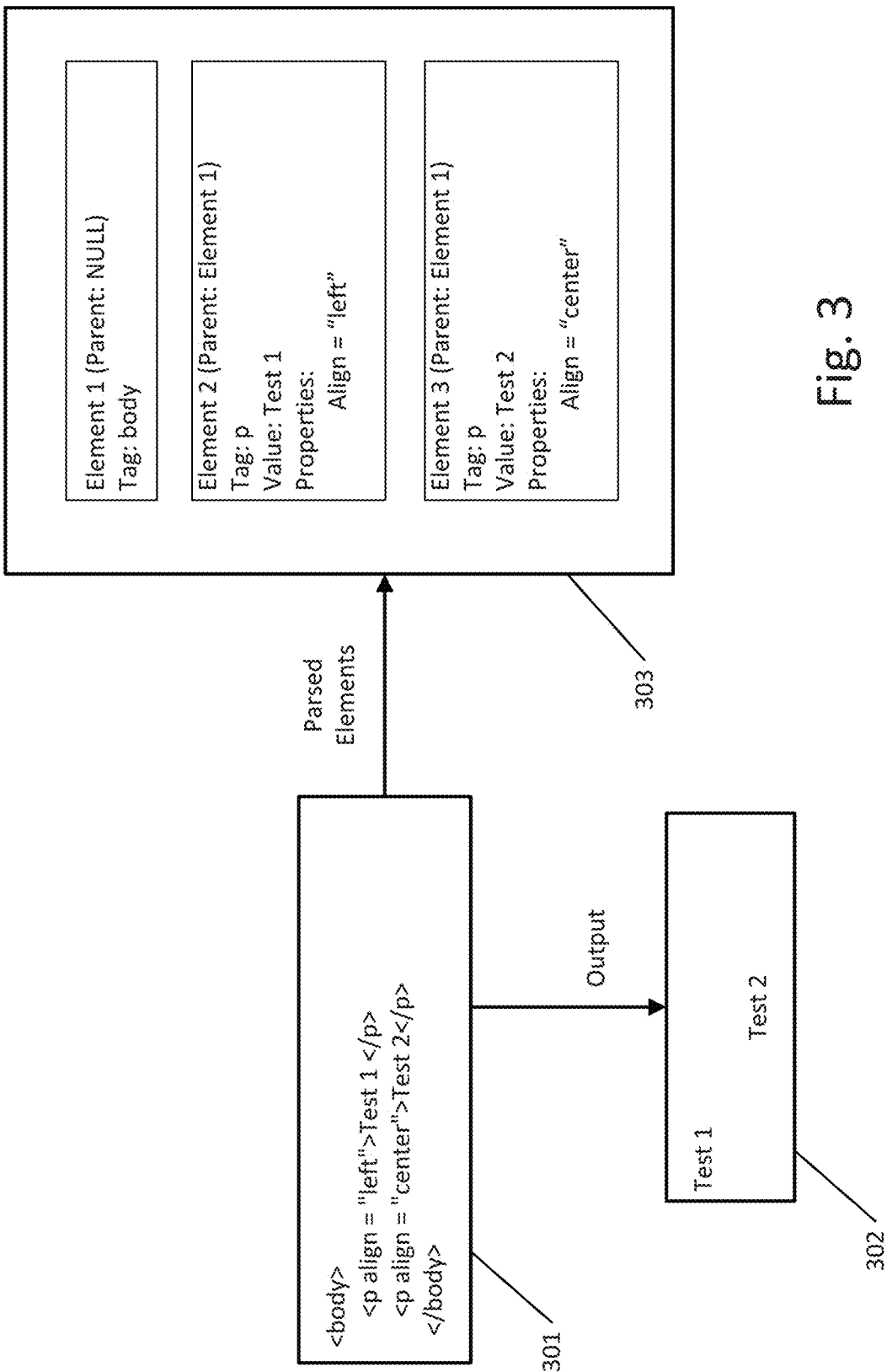
FIG. 3 illustrates another example of parsing an HTML DOM according to an exemplary embodiment.

FIG. 3 illustrates another example of parsing an HTML DOM according to an exemplary embodiment. The HTML DOM portion 301 results in output of the text shown in box 302 when the web page is rendered. As shown in FIG. 3, the HTML DOM portion 301 includes paragraph elements having properties that set alignment. These properties can be identified and stored as part of a list or data structure of elements 303 as a result of the parsing process. For example, element 2 in box 303 includes an "Align" property that specifies a left alignment and a value of "Test 1."

Parsing of the elements of the DOM can include specialized processing rules for different types of elements. For example, tables in an HTML DOM present unique challenges to the present system and can be parsed in a way that allows for accurate identification of which tables or portions of tables should be removed from the DOM.

There are a set of Tags used to define tables in HTML:
<TABLE>—defines the table container
<TR>—defines a table row
<TD>—defines a table cell
<TH>—defines a column header Tables serve two main purposes within HTML:
(1) To control the layout of any content within a web page. While this is no longer the preferred technique to control page layout, it is still in widespread use. However, a user has no visual indication that the table Tags are being used in this way.

(2) To present tabular data, i.e. data that a user would recognize as a table (Note that it is equally possible to used tags not specifically designed to hold tabular data such as <DIV> ands <SPAN> to place tabular data within the web page).

Because of the variation in possible usage of tables, it is necessary to be able to determine whether a table element (an element that has a tag associated with tables or used to define tables or parts of tables) actually contains tabular data in order to determine how to process the table elements (and whether to remove certain table elements). For example, empty cells in a table should not necessarily be removed if the table is meant to represent actual tabular data or results. However, in many cases, the table is used just for formatting purposes and does not contain any actual tabular data and empty cells can be removed.

Figure 4:
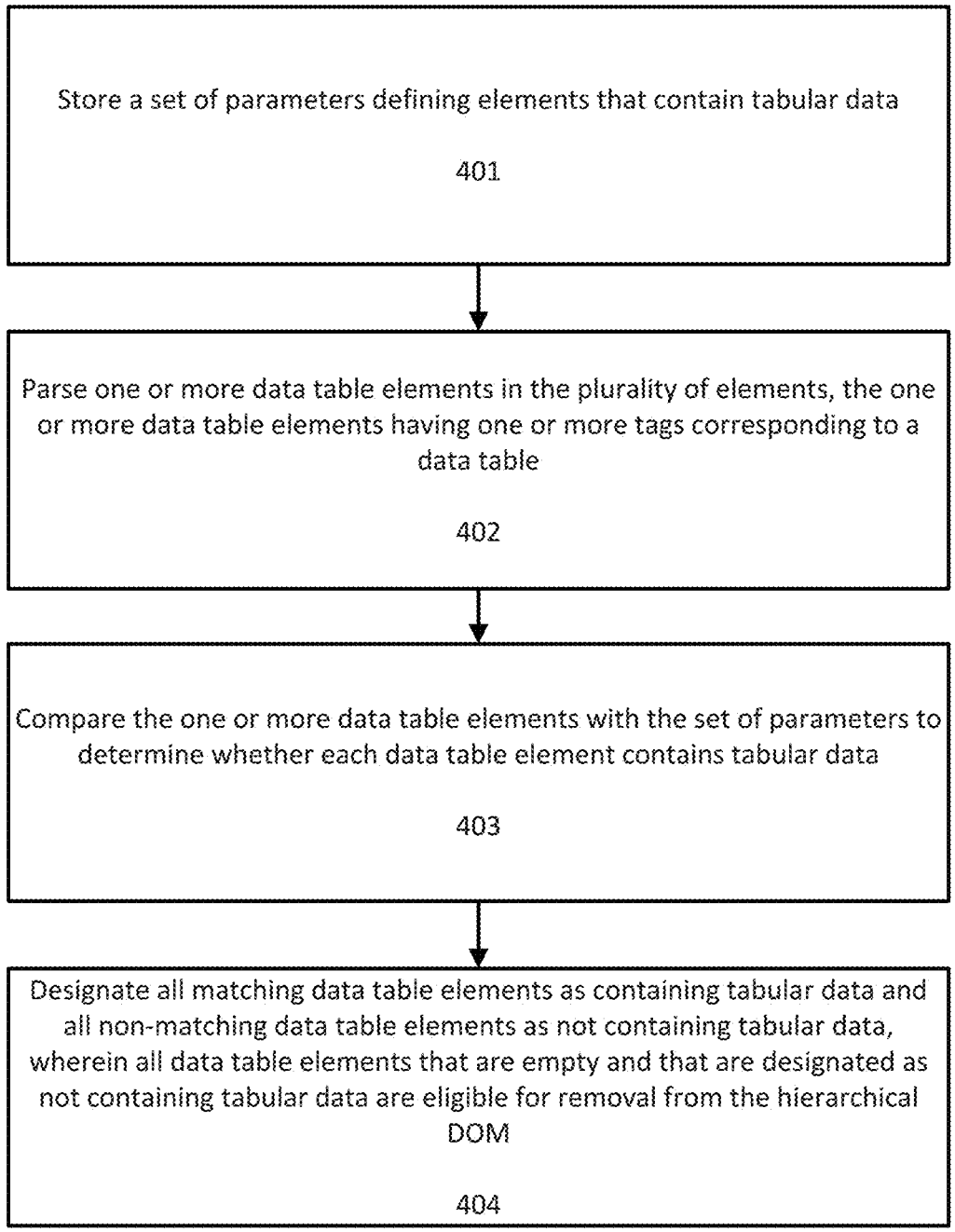
FIG. 4 illustrates a flowchart for parsing a plurality of elements in a hierarchical document object model to identify tabular data according to an exemplary embodiment.

FIG. 4 illustrates a flowchart for parsing a plurality of elements in a hierarchical document object model to identify tabular data according to an exemplary embodiment.

At step 401 a set of parameters defining elements that contain tabular data are stored. This stage of the process accepts a set of parameters that define the elements that contain real tabular data so that they can be converted into the appropriate Data Table, Row, Cell and Column Header Roles. The parameters can be entered by a user, stored in the system based on earlier user input or preferences, determined automatically based on historical analysis of table data, and/or derived from one or more rules.

The parameters can define the element tag, properties and search terms that define whether an element should be marked as part of a Data Table containing tabular data. For example, an element with a <TR> tag may contain a Class set to a value that indicates it holds a row of tabular data. Of course, these examples are for illustration only, and the parameters can include any type of Table, Row, Cell and Column Header identification rules At step 402 one or more data table elements in the plurality of elements are parsed, the one or more data table elements having one or more tags corresponding to a data table. This step detects data table elements based on the presence of tags associated with data tables in the particular DOM (e.g., TABLE, TR, TD, TH in HTML).

At step 403 the one or more data table elements are compared with the set of parameters to determine whether each data table element contains tabular data. This step applies the parameters to the parsed data table elements to determine whether they actually contain tabular data or whether the table element is used for formatting or other purposes.

At step 404 all matching data table elements are designated as containing tabular data and all non-matching data table elements are designated as not containing tabular data. This step is performed to indicate which elements are eligible for removal. In this case, all data table elements that are empty and that are designated as not containing tabular data are eligible for removal from the hierarchical DOM.

Figure 5:
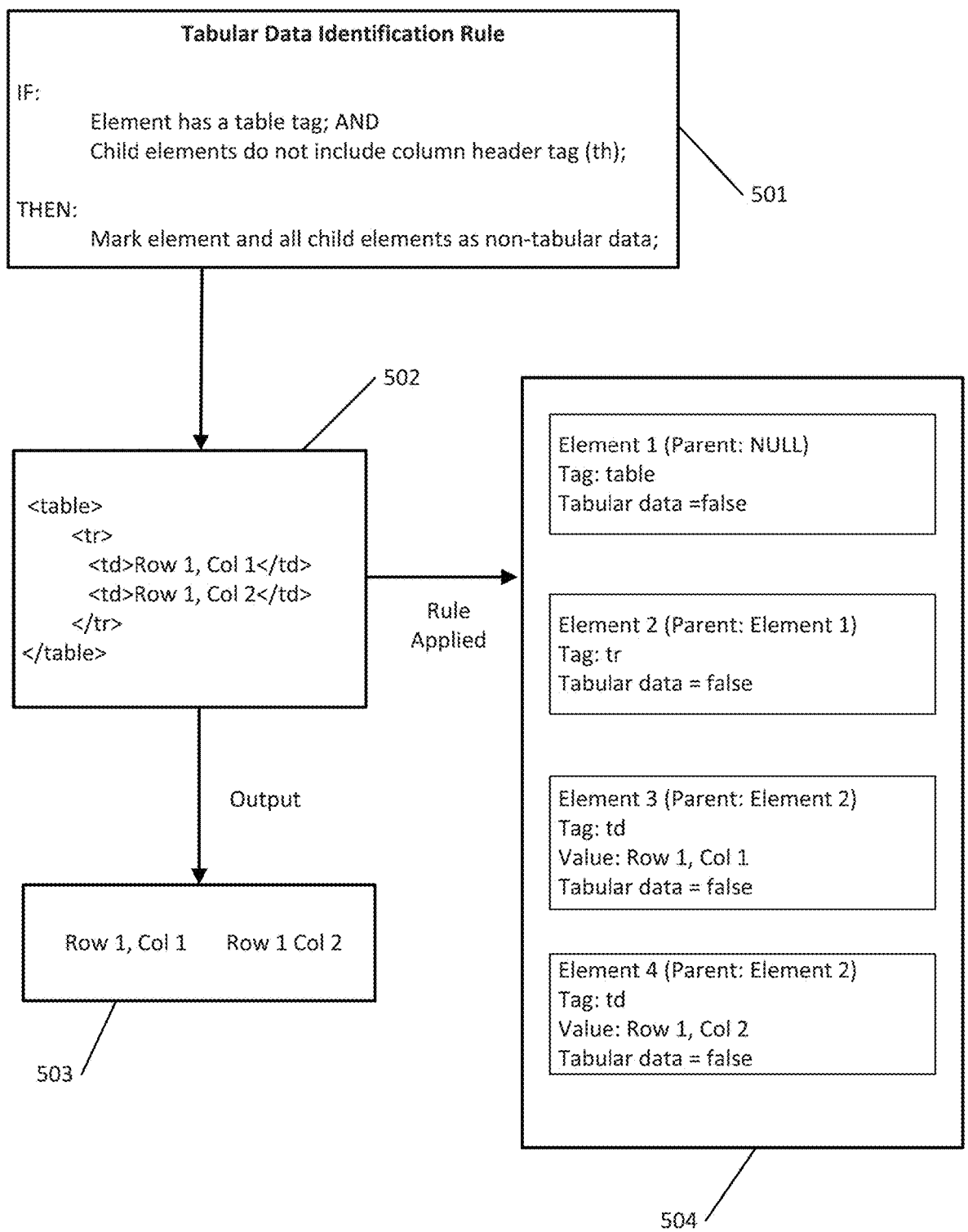
FIG. 5 illustrates an example of the table parsing and tabular data detection process according to an exemplary embodiment.

FIG. 5 illustrates an example of the table parsing and tabular data detection process according to an exemplary embodiment. As shown in box 501, an example tabular data identification rule is illustrated which can be used a parameter for the tabular data detection process. This rule specifies that if an element having the table tag is detected and no child elements of that element have a column header tag then the element all children are marked (designated) as containing non-tabular data. Of course, this rule is provided as an example only and is not intended to be limiting. Many different types of rules can be utilized to detect tabular data.

FIG. 5 also illustrates an HTML DOM 502 that produces the output shown in box 503. Box 504 illustrates the resulting elements when the HTML DOM 502 is parsed and the tabular data identification rule 501 is applied to the detected table elements. As shown in box 504, because the element having a table tag (element 1) does not have any child elements that include a column header tag, the element having the table tag and all of its children are designated as having non-tabular data. In this example, the detection of whether child elements have the specified tag can be performed by traversing upwards from the child elements to the table element. Alternatively, child pointers can be utilized. These examples are provided for illustration only and are not intended to be limiting.

Tables containing tabular data are sometimes constructed so that the table/column header area and the data row area are defined as separate tables within the HTML while appearing as single table entity to the user. The number of elements within the DOM can be further filtered by merging such tables together to produce a single table as it is perceived by the user. A collection of the table elements in a DOM can be created sorted by the vertical position of those elements so that any potential tables containing header information are processed before any following table containing tabular data. This collection can then be processed in sequence considering each sequential pair of tables in turn.

Figure 6:
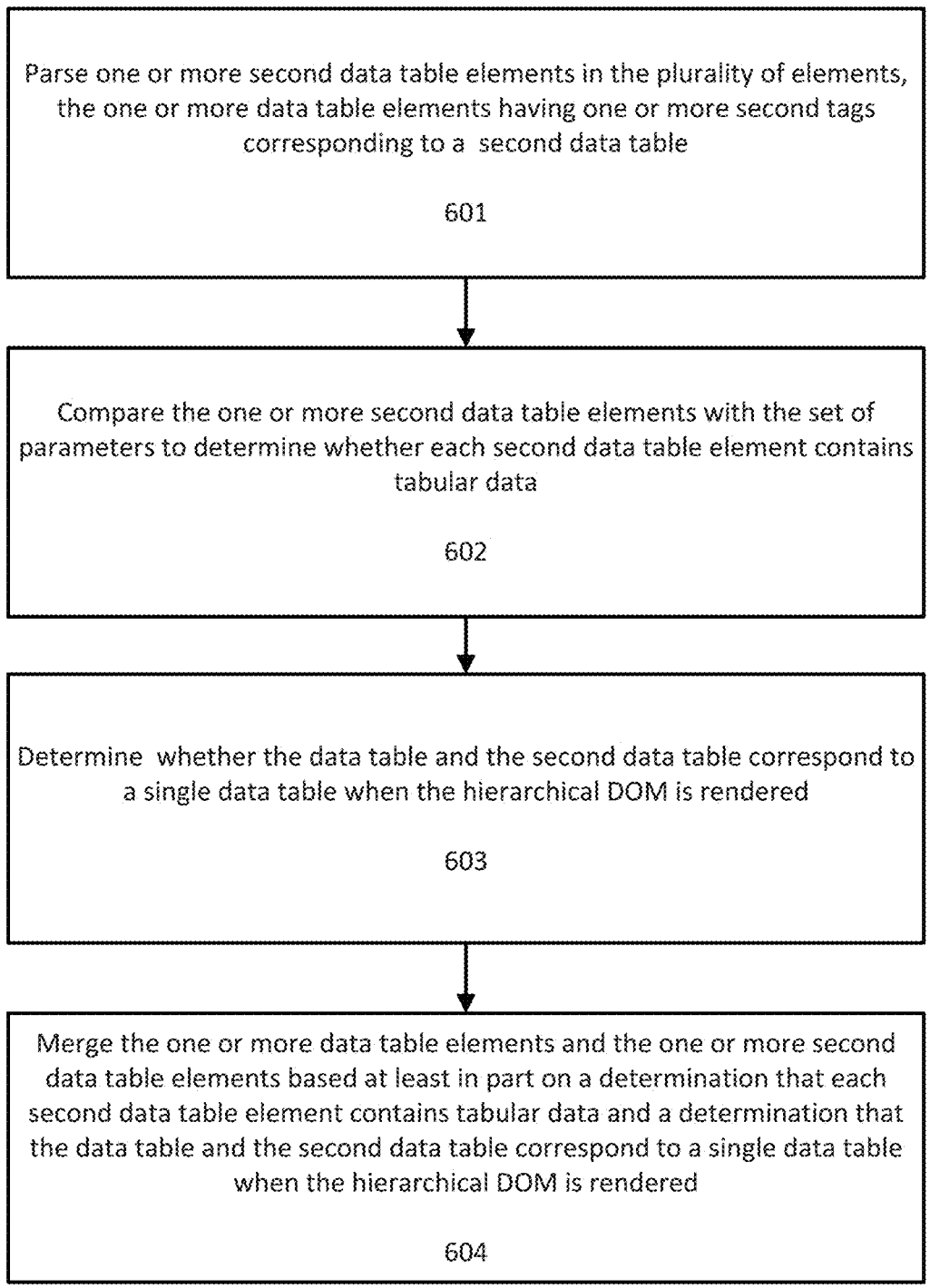
FIG. 6 illustrates a flowchart for parsing a plurality of elements in a hierarchical document object model to merge two or more tables according to an exemplary embodiment.

FIG. 6 illustrates a flowchart for parsing a plurality of elements in a hierarchical document object model to merge two or more tables according to an exemplary embodiment. The steps shown in FIG. 6 can be performed in addition to the steps shown in FIG. 4 in order to identify and merge tables in a DOM.

At step 601 one or more second data table elements in the plurality of elements are parsed, the one or more second data table elements having one or more second tags corresponding to a second data table.

At step 602 the one or more second data table elements are compared with the set of parameters to determine whether each second data table element contains tabular data. These parameters are discussed above with respect to FIGS. 4-5.

At step 603 a determination is made regarding whether the data table and the second data table correspond to a single data table when the hierarchical DOM is rendered. This determination can be based on matching data elements between the one or more data table elements and the one or more second data table elements and/or a common parent element between the one or more data table elements and the one or more second data table elements.

For example, tables can be merged if the left and right edges of the tables match or are within a predetermined matching threshold, if both table elements are child elements of the same parent element, and/or if the bottom of the previous table matches the top of the current table or is within a predetermined threshold.

The determination regarding whether the data table and the second data table correspond to a single data table when the hierarchical DOM is rendered can be based on one or more parameters and associated values that are set by the user. These parameters control the tolerance for matching and/or what types of comparisons or checks are used to identify tables for merging. For example, the parameters can include the following Table Merge values:

Left and Right margin tolerance for matching between the tables. By default, this parameter value can be set to zero;

Boolean indicating whether both tables must share a common parent; and/or

Permitted gap value indicating the maximum allowable gap between the bottom one table and the beginning of the next. By default, this parameter value is set to five.

At step 604 the one or more data table elements and the one or more second data table elements are merged based at least in part on a determination that each second data table element contains tabular data and a determination that the data table and the second data table correspond to a single data table when the hierarchical DOM is rendered. The merging process can include removing a parent second data table element in the one or more second data table elements and re-parenting the children of the removed parent second data table element to a parent data table element in the one or more data table elements.

Figure 7:
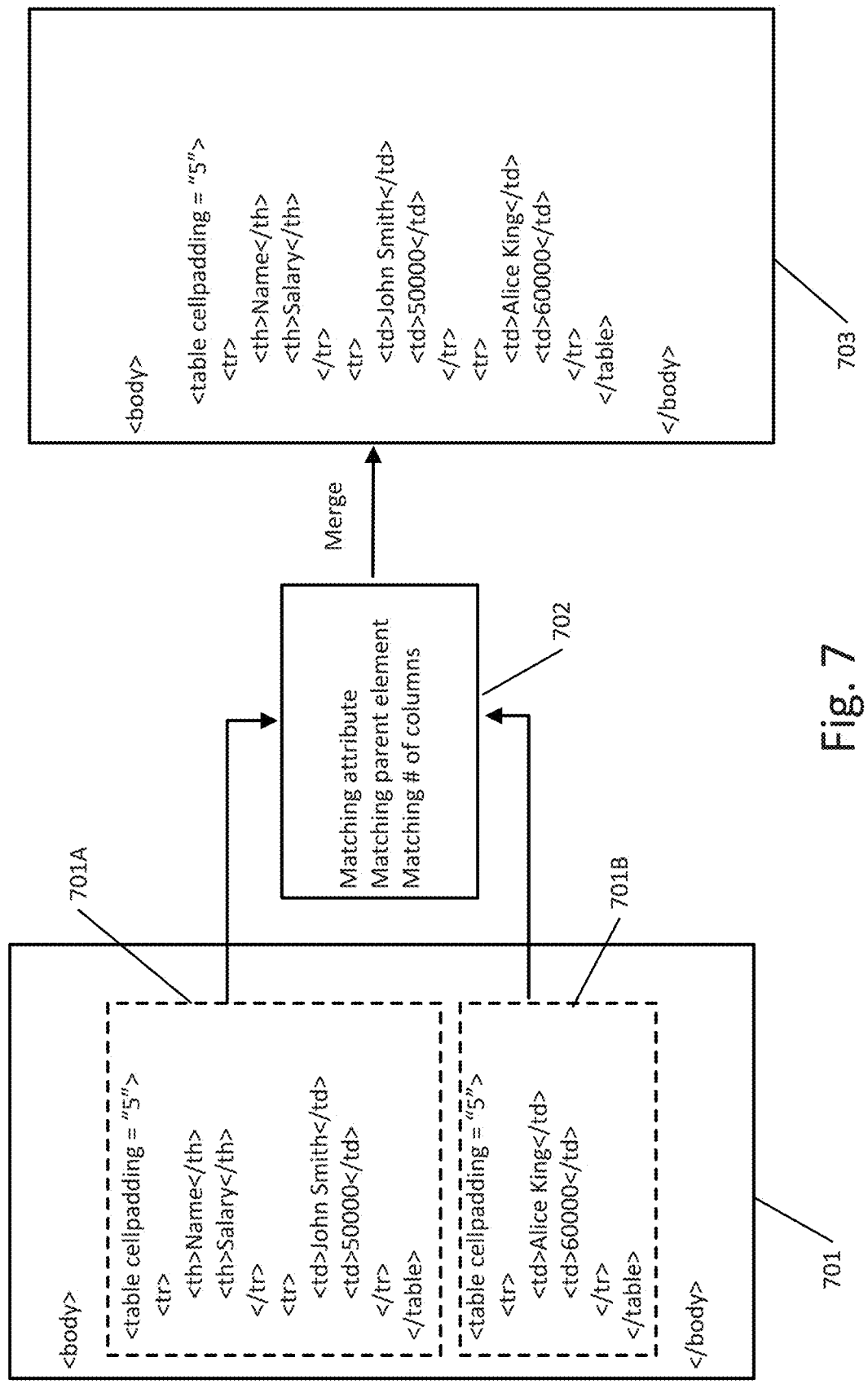
FIG. 7 illustrates an example of the table merge process for two tables according to an exemplary embodiment.

FIG. 7 illustrates an example of the table merge process for two tables in HTML DOM 701. As shown in FIG. 7, predefined parameters are used to compare properties and values of elements in table 701A and table 702B. As shown in box 702, the two tables having matching attributes, matching parent elements, and a matching number of columns. Based on this, the two tables can be merged, resulting the merged table shown in HTML DOM 703. Of course, this example is provided for illustration only and a variety of criteria can be used to determine whether to merge the two tables.

Returning to FIG. 1, at step 102 one or more invisible elements in the plurality of elements are removed. As part of this step, the one or more invisible elements are determined based at least in part on one or more properties of each invisible element. Each invisible element is an element of the DOM that is hidden from a user when the DOM is rendered. In other words, each invisible element can be considered a non-rendered element within the DOM or an element that does not have any visual representation when rendering the DOM. Elements are processed through the hierarchy so that a parent element is always processed before its child elements and the child elements before the grandchild elements.

For example, a DOM element can be hidden from a user by:

(1) Setting the 'display=none' property. Note that this causes both the element where the property is set to be invisible but also all its child elements;

(2) Setting the 'visibility=hidden' property. Note that this causes both the element where the property is set to be invisible but also by default all its child elements. Note however that a child element can become visible by setting the element style to 'visibility=visible' or by setting the 'display' property to anything other than 'none';

(3) making the element height or width properties to zero or less than or equal to the parameter minimum value. Note that setting such a rectangle has no effect on the visibility of child elements.

Figure 8:
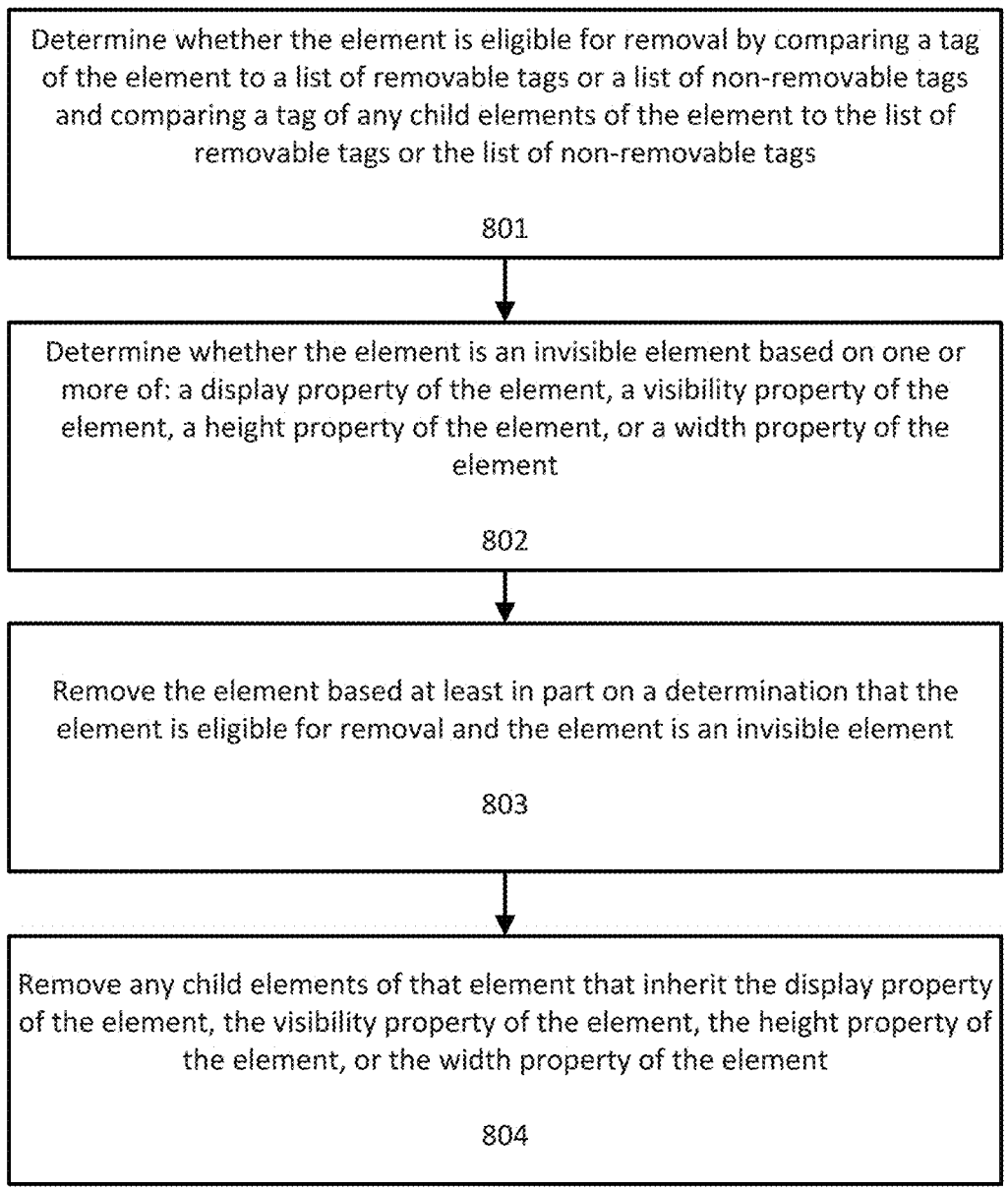
FIG. 8 illustrates a flowchart for removing one or more invisible elements in the plurality of elements according to an exemplary embodiment.

FIG. 8 illustrates a flowchart for removing one or more invisible elements in the plurality of elements according to an exemplary embodiment. The process shown in FIG. 8 can be performed for each element in the plurality of elements.

At step 801 it is determined whether the element is eligible for removal by comparing a tag of the element to a list of removable tags or a list of non-removable tags and comparing a tag of any child elements of the element to the list of removable tags or the list of non-removable tags.

Certain HTML DOM tags can be excluded from this process as they are by their nature designed to be invisible. For example, the selectable entries within a Combo Box are invisible by definition and only become dynamically visible when the Combo Box is expanded. In addition any elements that have a Click event listener attached can be excluded from this process. The excluded tags can be stored in a list of non-removable tags. Alternatively, all tags that are not excluded can be stored in a list of removable tags.

By default, the following tags can be excluded from removal by the invisible element removal process (note that this list can be overridden by a parameter value):

<OPTION> which defines selectable entries within a Combo Box

<OPTGROUP> which defines non-selectable, sections within a Combo Box

At step 802 it is determined whether the element is an invisible element based on one or more of: a display property of the element, a visibility property of the element, a height property of the element, or a width property of the element. This step can include performing one or more of the following checks:

(1) Checking whether the 'display=none' property is set.

(2) Checking whether the 'visibility=hidden' property is set.

(3) Checking whether the element height or width properties are equal to zero or less than or equal to a predefined minimum threshold value.

The predefined minimum threshold values can be set by user parameters, such as a minimum height or width for visibility.

At step 803 the element is removed based at least in part on a determination that the element is eligible for removal and the element is an invisible element.

At step 804 any child elements of that element that inherit the display property of the element, the visibility property of the element, the height property of the element, or the width property of the element are also removed. The identification of hidden elements is a recursive process as once an element has been identified as hidden by the 'display' or 'visibility' property, its children must also be examined and can also be removed subject to the notes in this section.

Returning to FIG. 1, at step 103 one or more empty elements in the plurality of elements are removed based at least in part on the one or more tags of each element in the plurality of elements. Each empty element comprises a tag without any associated values. Elements are processed through the hierarchy so that a parent element is always processed before its child elements and the child elements before the grandchild elements.

Figure 9:
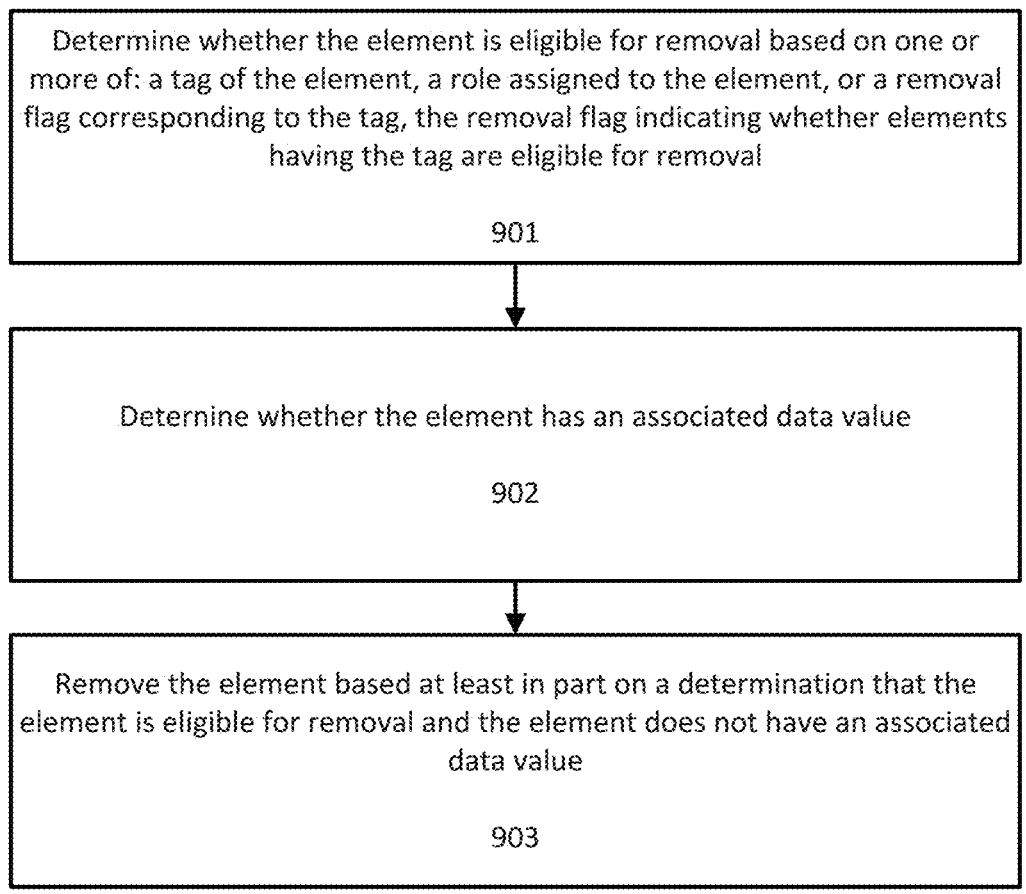
FIG. 9 illustrates a flowchart for removing one or more empty elements in the plurality of elements based at least in part on the one or more tags of each element in the plurality of elements according to an exemplary embodiment.

FIG. 9 illustrates a flowchart for removing one or more empty elements in the plurality of elements based at least in part on the one or more tags of each element in the plurality of elements according to an exemplary embodiment.

At step 901 it is determined whether the element is eligible for removal based on one or more of: a tag of the element, a role assigned to the element, or a removal flag corresponding to the tag, the removal flag indicating whether elements having the tag are eligible for removal. A role is a grouping of the various HTML tags. Certain tags or roles may be excluded from removal by the empty element removal process. Step 901 can check whether an element is eligible for removal by comparing a tag or role of the element against a list of tags or roles that are eligible for removal or not eligible for removal or by checking a removal flag value that encodes this information.

The table below provides an example of the different types of roles that can be assigned to a tag.

| Role Name | Description |
| --- | --- |
| Area | Defines sections of a web page |
| Button | A clickable button |
| Cell | The intersection of a Row and a Column |
| Check Box | An input capable control providing a binary selection |
| Color Picker | Provides a user selectable choice |
| Column Header | Typically, text describing the contents of a column |
| Combo Box | A drop-down list of user selectable values |
| Content Header | The container for all other content |
| Data Table | An area containing tabular data |
| File Picker | Provides a user selectable choice |
| Form | A grouping of inputs associated with a Submit action |
| Hyperlink | Supports navigation to other URLs |
| Image | A graphic or picture |
| Input Box | An input capable control where keystrokes can be entered |
| List | An order or unordered list of data |
| List Item | Part of a List or Combo Box |
| Not Needed | Applied to HTML Tags that are not relevant to the user |
| Radio Button | An input capable control providing a binary selection |
| Range Picker | A slider input control supporting a range of values |
| Row | A horizontal section of a table |
| Table | A table |
| Text | Labels and paragraphs |

Additionally, the table below provides an example of different HTML tags in the HTML DOM and removal flags corresponding to the different HTML tags:

| Tag Name | Role | Remove if Empty | Convert to Text |
| --- | --- | --- | --- |
| AA | Hyperlink | true | false |
| ABBRABBR | Text | true | false |
| ADDRESS | Text | true | false |
| AREA | Not Needed | true | false |
| ARTICLE | Not Needed | true | false |
| ASIDE | Text | true | false |
| AUDIO | Not Needed | false | false |
| B | Text | true | false |
| BASE | Not Needed | true | false |
| BDI | Text | false | false |
| BDO | Text | false | false |
| BLOCKQUOTE | Text | true | false |
| BODY | Area | true | true |
| BR | Not Needed | true | false |
| BUTTON | Button | false | false |
| CANVAS | Not Needed | false | false |
| CAPTION | Text | false | false |
| CITE | Text | true | false |
| CODE | Text | true | false |
| COL | Not Needed | false | false |
| COLGROUP | Not Needed | false | false |
| COMMENT | Not Needed | true | false |
| DATA | Text | false | false |
| DATALIST | List | false | false |
| DD | Text | true | false |
| DEL | Text | false | false |
| DETAILS | Text | false | false |
| DFN | Text | false | false |
| DIALOG | Area | true | false |
| DIV | Area | true | true |
| DL | List | false | false |
| DT | List Item | false | false |
| EM | Text | true | false |
| EMBED | Not Needed | false | false |
| FIELDSET | Area | false | false |
| FIGCAPTION | Text | true | false |
| FIGURE | Not Needed | false | false |
| FOOTER | Area | false | false |
| FORM | Form | false | false |
| H1 | Text | true | false |
| H2 | Text | true | false |
| H3 | Text | true | false |
| H4 | Text | false | False |
| H5 | Text | true | false |
| H6 | Text | true | false |
| HEAD | Not Needed | false | false |

-continued

| Tag Name | Role | Remove if Empty | Convert to Text |
|---|---|---|---|
| HEADER | Area | true | true |
| HR | Not Needed | false | false |
| HTML | Not Needed | false | false |
| I | Image | false | false |
| IFRAME | Area | false | false |
| IMG | Image | false | false |
| INPUT | Input Box | false | false |
| INS | Text | true | false |
| KBD | Text | false | false |
| LABEL | Text | true | false |
| LEGEND | Text | true | false |
| LI | List Item | false | false |
| LINK | Not Needed | true | false |
| MAIN | Not Needed | false | false |
| MAP | Not Needed | false | false |
| MARK | Text | true | false |
| META | Not Needed | false | false |
| METER | Not Needed | false | false |
| NAV | Not Needed | true | false |
| NOSCRIPT | Not Needed | false | false |
| OBJECT | Not Needed | false | false |
| OL | List | false | false |
| OPTGROUP | List Item | false | false |
| OPTION | List Item | true | false |
| OUTPUT | Text | false | false |
| P | Text | true | false |
| PARAM | Not Needed | true | false |
| PICTURE | Image | false | false |
| PRE | Text | false | false |
| PROGRESS | Not Needed | false | false |
| Q | Text | true | false |
| RP | Not Needed | false | false |
| RT | Not Needed | false | false |
| RUBY | Not Needed | false | false |
| S | Text | true | false |
| SAMP | Text | true | false |
| SCRIPT | Not Needed | false | false |
| SECTION | Area | true | true |
| SELECT | Combo Box | false | false |
| SMALL | Text | true | false |
| SOURCE | Not Needed | false | false |
| SPAN | Area | true | true |
| STRONG | Text | true | false |
| STYLE | Not Needed | false | false |
| SUB | Text | true | false |
| SUMMARY | Text | false | false |
| SUP | Text | true | false |
| SVG | Image | false | false |
| TABLE | Table | false | false |
| TBBODY | Not Needed | true | false |
| TD | Cell | false | false |
| TEMPLATE | Not Needed | false | false |
| TEXT | Text | true | true |
| TEXTAREA | Input Box | false | false |
| TFOOT | Not Needed | false | false |
| TH | Column Header | false | false |
| THEAD | Not Needed | true | false |
| TIME | Text | true | false |
| TITLE | Not Needed | false | false |
| TR | Row | false | false |
| TRACK | Not Needed | false | false |
| U | Text | true | false |
| UL | List | false | false |
| VAR | Text | false | false |
| VIDEO | Not Needed | false | false |
| WBR | Text | false | false |
| WINDOW | Not Needed | true | false |
| ACRONYM | Text | true | false |
| APPLET | Not Needed | false | false |
| BASEFONT | Not Needed | false | false |
| BIG | Text | true | false |
| CENTER | Text | true | false |
| DIR | List | false | false |
| FONT | Text | true | false |
| FRAME | Area | false | false |
| FRAMESET | Not Needed | false | false |
| NOFRAMES | Not Needed | false | false |
| STRIKE | Text | true | false |
| TT | Text | true | false |

Each row of the above table includes a tag name, a role that the tag can be assigned to, a "remove if empty" flag value, and a convert to text flag value. The convert to text flag value is utilized to determine whether the value of the element can be converted into text, and is discussed in greater detail below.

At step 902 it is determined whether the element has an associated data value or whether the element is empty. This step can be omitted if the element is designated as a non-removable element.

At step 903 the element is removed based at least in part on a determination that the element is eligible for removal and the element does not have an associated data value.

In addition to removal of invisible elements and removal of empty elements, the HTML DOM can be further filtered to remove non-rendered elements by conversion of more complex elements to text roles and absorbing child elements into parent elements.

Figure 10:
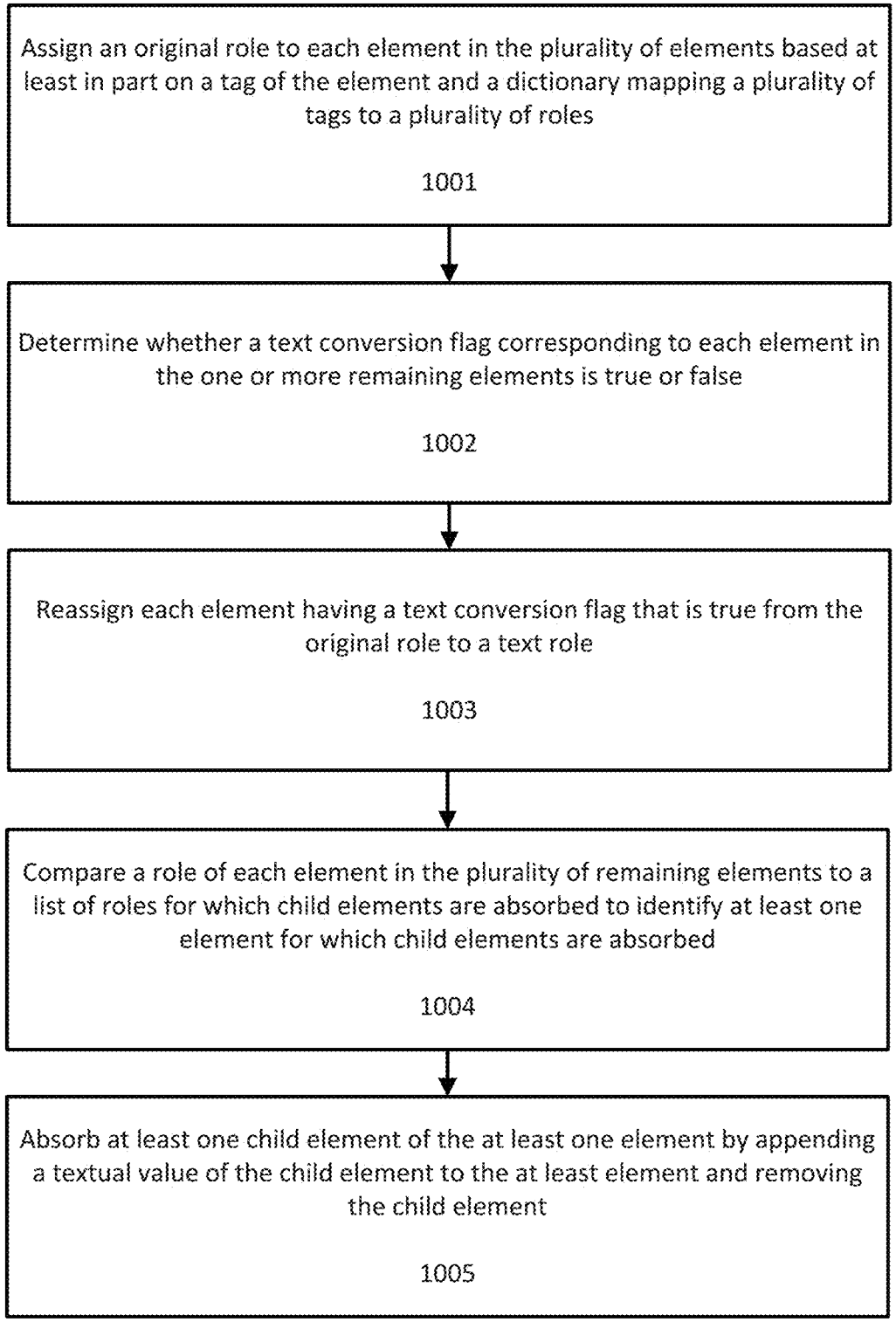
FIG. 10 illustrates a flowchart for reassigning elements to text roles and absorbing child elements into parent elements according to an exemplary embodiment.

FIG. 10 illustrates a flowchart for reassigning elements to text roles and absorbing child elements into parent elements according to an exemplary embodiment.

At step 1001 an original role is assigned to each element in the plurality of elements based at least in part on a tag of the element and a dictionary mapping a plurality of tags to a plurality of roles. For example, the dictionary can take the form of the table shown above. Optionally, the role can then be overridden under the following circumstances if the initially assigned role is Input Box or Button:

If the element type is set to 'SUBMIT' the Role is set to Button

If the element type is set to 'BUTTON' the Role is set to Button

If the element type is set to 'RESET' the Role is set to Button

If the element type is set to 'FILE' the Role is set to File Picker

If the element type is set to 'COLOR' the Role is set to Color Picker

If the element type is set to 'RANGE' the Role is set to Range

If the element type is set to 'CHECKBOX' the Role is set to Check Box

If the element type is set to 'RADIO' the Role is set to Radio Button

At step 1002 it is determined whether a text conversion flag corresponding to each element in the one or more remaining elements is true or false As discussed above, the text conversion flag indicates whether the element can be converted into a text role. For example, a DIV tag defines an area on the web page but can also contain text. The area is not visible to the user and should be discarded while the text within it should be retained.

At step 1003 each element having a text conversion flag that is true is reassigned from the original role to a text role.

At step 1004 a role of each element in the plurality of remaining elements is compared to a list of roles for which child elements are absorbed to identify at least one element for which child elements are absorbed. For example, user-defined parameters can indicate that if the role of an element is one of Button, Check Box, Hyperlink, or Radio Button, then the textual value of each its children can be appended to the parent and the children removed. User parameters can also include a list of roles where child structure should be retained.

On occasions a web developer may have created a simple visual effect using a structure that is not apparent to the user. For example, a <BUTTON> tag supports a property that will be rendered as the caption of the button. However, a developer could choose not to use this property but to create a separate child <SPAN> tag holding that caption.

The purpose of the process shown in FIG. 10 is to present the content as the user expects while reducing the number of elements in the DOM that are not required to present that content. The elements of the DOM should be processed through the hierarchy so that a parent element is always processed before its child elements and the child elements before the grandchild elements.

At step 1005 at least one child element of the at least one element is absorbed by appending a textual value of the child element to the at least element and removing the child element.

Returning to FIG. 1, at step 104 one or more remaining elements in a plurality of remaining elements of the hierarchical DOM are identified that have one or more parent elements that have been removed from the hierarchical DOM. These can be identified, for example, by examining parent identifiers or parent pointers of elements to determine whether the parent elements are still included in the DOM. Alternatively, children of parent elements that have been removed can be detected through parsing the DOM, comparing the DOM to the initial version of the DOM, tracking all removals of elements, and/or by traversing child elements and adding them to a list after removal of each element.

When this stage in the process is reached all elements eligible for removal will have been removed. However, the remaining hierarchy of elements may still contain a depth of structure that provides no value to the user. The process therefore flattens the hierarchy to remove empty levels.

At step 105 the one or more remaining elements are re-parented to one or more new parent elements remaining in the hierarchical DOM based at least in part on traversing the hierarchical DOM from each of the one or more remaining elements.

Figure 11:
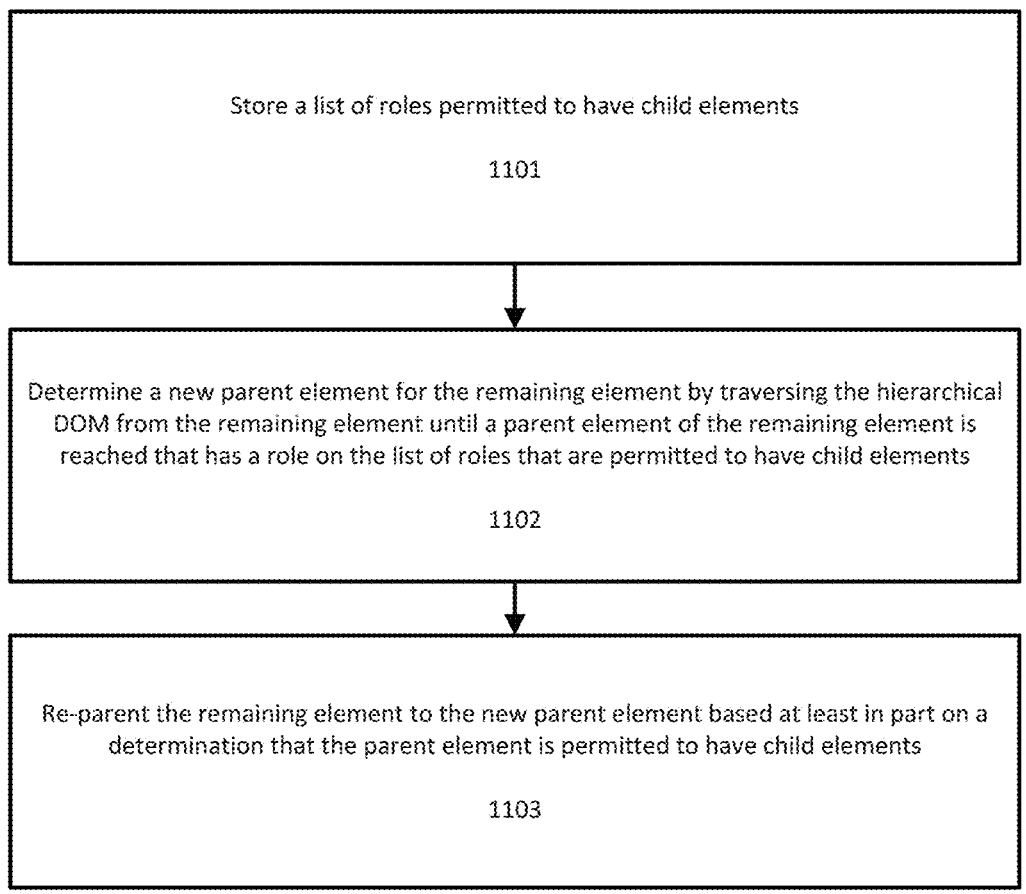
FIG. 11 illustrates a flowchart for re-parenting each remaining elements to a mew parent element according to an exemplary embodiment.

FIG. 11 illustrates a flowchart for re-parenting each remaining elements to a mew parent element according to an exemplary embodiment. As discussed below, the re-parenting process can utilize roles, discussed earlier, to determine which elements are permitted to have child elements.

At step 1101 a list of roles permitted to have child elements is stored. This list can be determined based on user parameters and can include, for example, the following roles:
 Cell
 Column Header
 Content Header
 Combo Box
 Form
 List
 List Item
 Row
 Table At step 1102 a new parent element is determined for the remaining element by traversing the hierarchical DOM from the remaining element until a parent element of the remaining element is reached that has a role on the list of roles that are permitted to have child elements.

The parent hierarchy is navigated until the first element which is permitted to hold a structure is found. This is the flattened hierarchy parent. Once found, then at step 1104 the remaining element is re-parented to the new parent element based at least in part on a determination that the parent element is permitted to have child elements.

Figure 12:
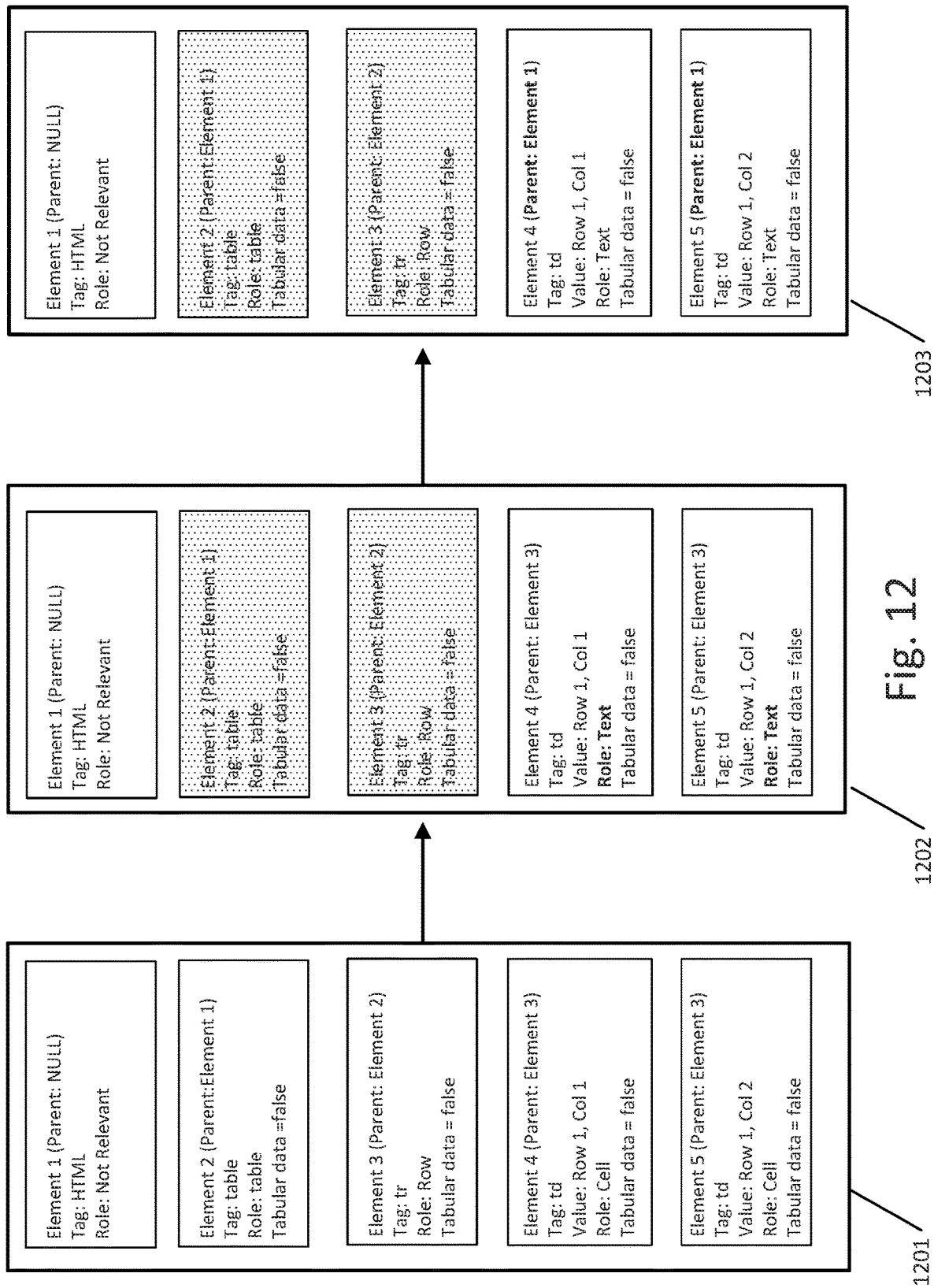
FIG. 12 illustrates an example of the re-parenting process according to an exemplary embodiment.

FIG. 12 illustrates an example of the re-parenting process according to an exemplary embodiment. Box 1201 shows the elements in the initial version of the DOM. As shown in box 1202, elements 2 and 3 are removed from DOM because they are empty table elements that do not store tabular data. This process is described above with respect to FIGS. 4-5 and 9. Also shown in box 1202 is the reassignment of the roles for elements 4 and 5 from a "cell" role (in box 1201) to a "text" role. This conversion of roles is discussed with respect to FIG. 10.

As can be seen from box 1202, the removal of element 3 results in remaining elements 4 and 5 missing a parent element. These elements are then re-parented using the above-described process to generate the element structure shown in box 1203. Since element 2 is also removed, the next available parent for elements 4 and 5 is element 1.

Figure 13:
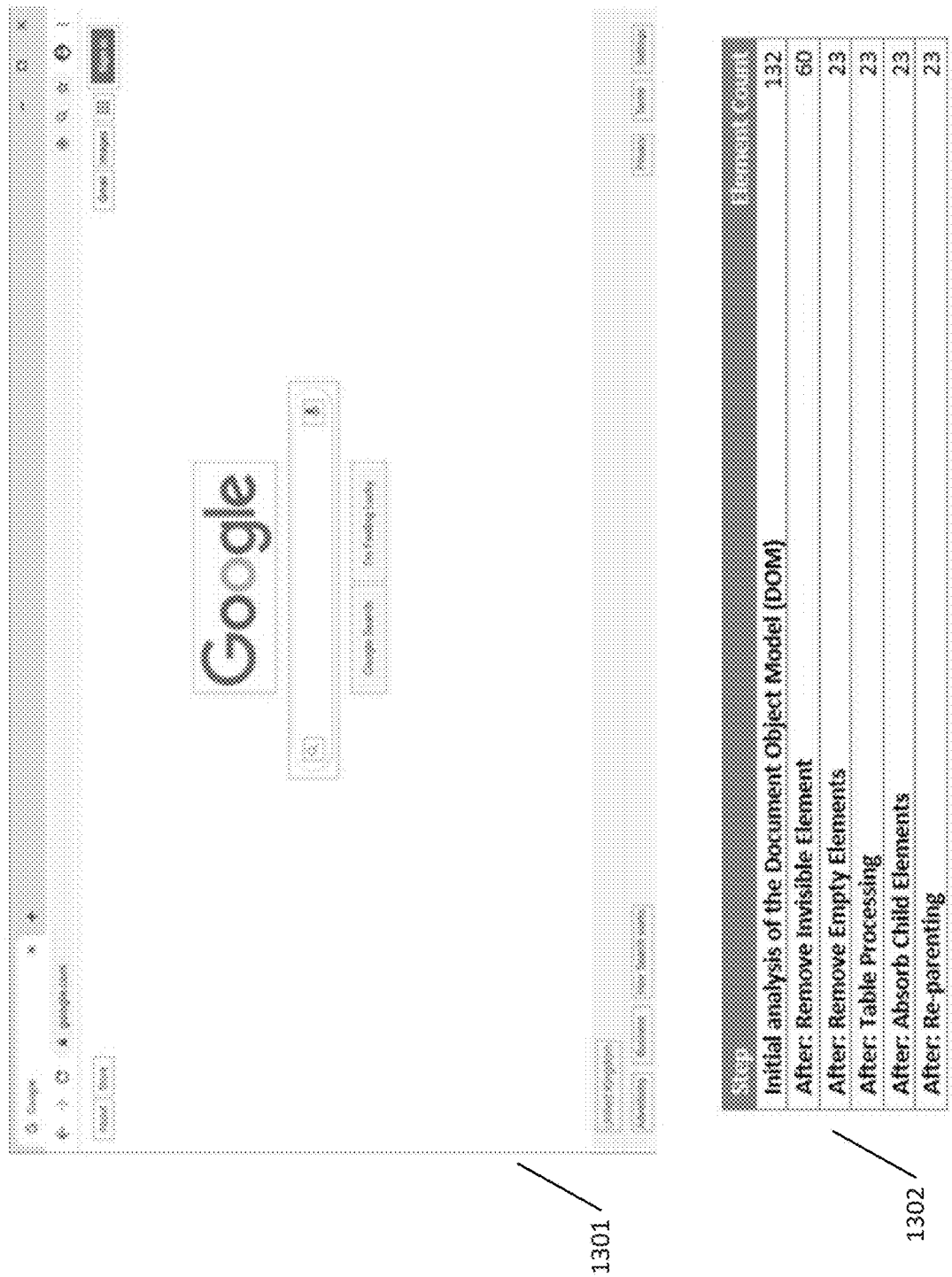
FIG. 13 illustrates an example of applying the disclosed system and method for transforming a hierarchical DOM to filter non-rendered elements according to an exemplary embodiment.
Figure 14:
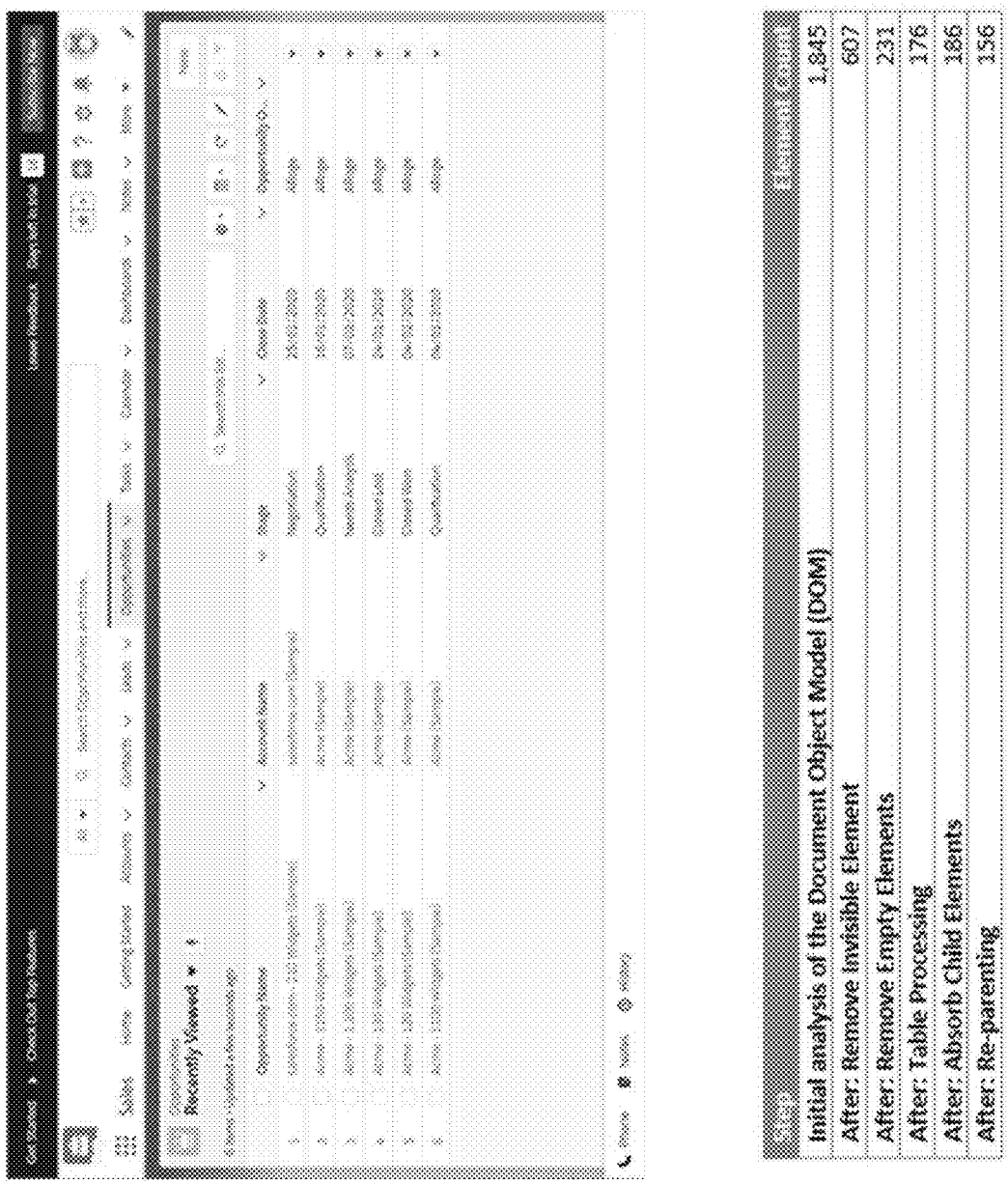
FIG. 14 illustrates another example of applying the disclosed system and method for transforming a hierarchical DOM to filter non-rendered elements according to an exemplary embodiment.

FIGS. 13-14 illustrate examples of applying the disclosed system and method for transforming a hierarchical DOM to filter non-rendered elements to existing DOMs.

In FIG. 13 the disclosed methods are applied to a Google™ homepage, shown in window 1301. The homepage includes 19 items visible to the user. Box 1302 shows the quantity of elements at each stage of the filtering and transformation process. As shown in box 1302, the overall process reduces the total number of elements from 132 initially to 23 by the end of the process. In this case, the content reduction process has retained only 4 elements beyond those visible to the user. These are:
 A 'Window' element containing all the other elements;
 The central portion of this Google page that is contained within a HTML <Form> element; and
 In two cases the hyperlink for an image has been specified as a separate HTML <A> element and these have been retained.

FIG. 14 illustrates the result of applying the disclosed system and method for transforming a hierarchical DOM to filter non-rendered elements to a Salesforce™ web page 1401. On the page 1401 there are 110 elements visible to the user. As shown in box 1402 the total number of elements in the DOM has been reduced from 1,845 at the beginning of the process to 156 after completion. This includes only 46 elements beyond those visible to the user, corresponding to lists and list items and structures with button elements that should be retained.

These reductions in elements have many advantages. From a storage and efficiency perspective, the reduced element version of the DOM provides the same information to a user viewing the web page but is much more compact and has a smaller storage footprint. Additionally, from a web design perspective, users who are not well-versed in HTML or do not have the technical background to understand all the existing HTML tags and elements are presented with a much simpler DOM in which most elements correspond directly to information rendered as part of the web page.

Figure 15:
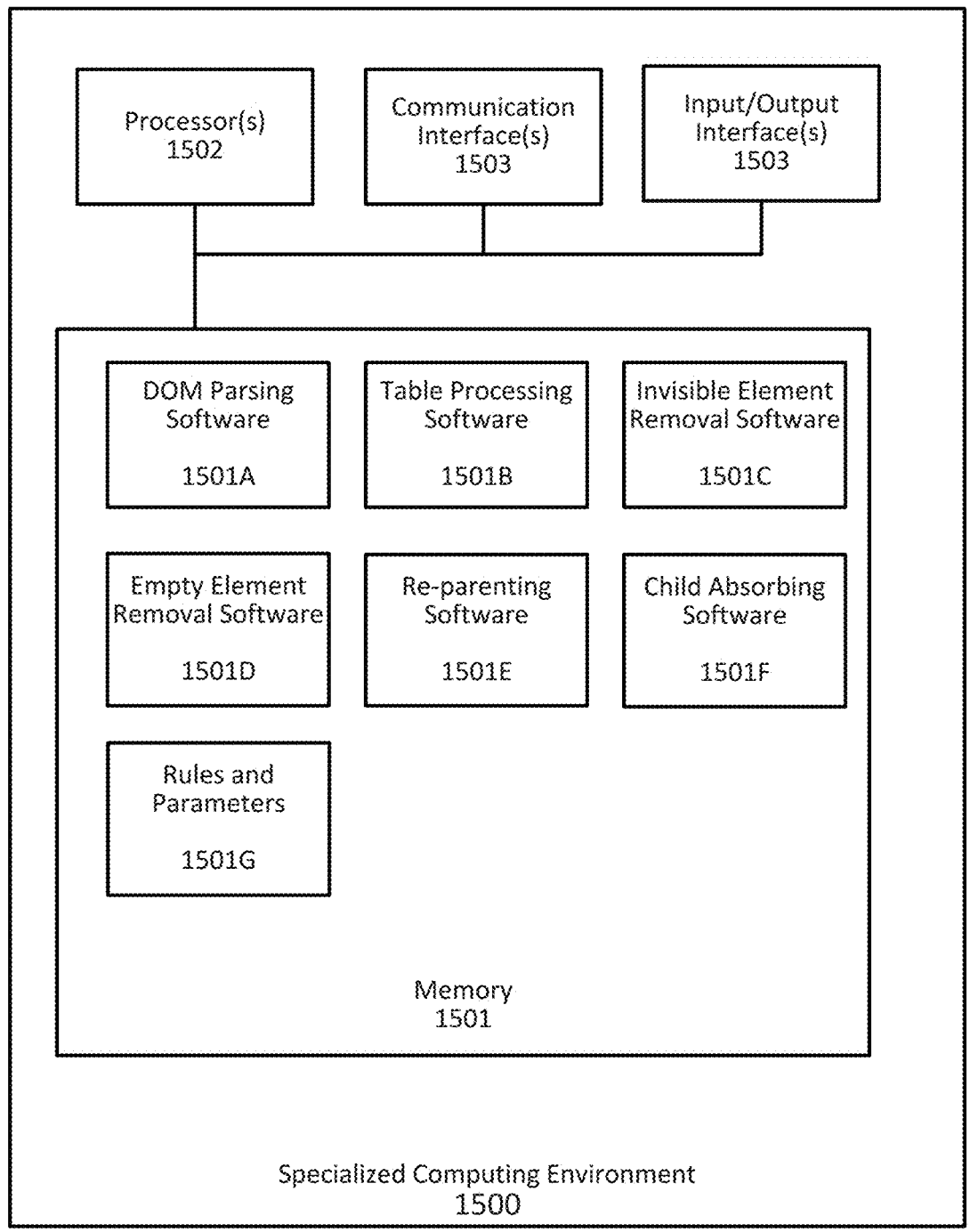
FIG. 15 illustrates the components of the specialized computing environment for transforming a hierarchical document object model (DOM) to filter non-rendered elements according to an exemplary embodiment.

FIG. 15 illustrates the components of the specialized computing environment 1500 configured to perform the processes described herein. Specialized computing environment 1500 is a computing device that includes a memory 1501 that is a non-transitory computer-readable medium and can be volatile memory (e.g., registers, cache, RAM), nonvolatile memory (e.g., ROM, EEPROM, flash memory, etc.), or some combination of the two.

As shown in FIG. 15, memory 1501 can include DOM parsing software 1501A, table processing software 1501B, invisible element removal software 1501C, empty element removal software 1501D, re-parenting software 1501E, child absorbing software 1501F, and rules and parameters 1501G. Memory 1501 can also include storage to store the DOM and intermediate versions after processing by one or more of the software components. Each of the software components in memory 1501 store specialized instructions and data structures configured to perform the corresponding functionality and techniques described herein.

All of the software stored within memory 1501 can be stored as a computer-readable instructions, that when executed by one or more processors 1502, cause the processors to perform the functionality described with respect to FIGS. 1-14.

Processor(s) 1502 execute computer-executable instructions and can be a real or virtual processors. In a multi-processing system, multiple processors or multicore processors can be used to execute computer-executable instructions to increase processing power and/or to execute certain software in parallel.

Specialized computing environment 1500 additionally includes a communication interface 1503, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 1500 further includes input and output interfaces 1504 that allow users (such as system administrators) to provide input to the system to set parameters, to edit data stored in memory 1501, or to perform other administrative functions.

An interconnection mechanism (shown as a solid line in FIG. 52), such as a bus, controller, or network interconnects the components of the specialized computing environment 1500.

Input and output interfaces 1504 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 1500.

Specialized computing environment 1500 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 1500.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method executed by one or more computing devices for transforming a hierarchical document object model (DOM) to filter non-rendered elements, the method comprising:
    parsing a plurality of elements in a hierarchical DOM to identify respective one or more tags of each element in the plurality of elements, each property, if any, of each element in the plurality of elements, and each value, if any, of each element in the plurality of elements;
    determining one or more invisible elements in the plurality of elements based at least in part on one or more checks on each of the plurality of elements;
    removing, from the hierarchical DOM, the one or more invisible elements in the plurality of elements, the one or more invisible elements being further determined based at least in part on one or more properties of each invisible element, each invisible element comprising an element of the hierarchical DOM that is hidden from a user when the hierarchical DOM is rendered;
    determining a first set of elements in the plurality of elements based at least in part on comparing the one or more tags of each element in the plurality of elements against a list of tags that are eligible for removal;
    removing, from the hierarchical DOM, each element in the first set of elements;
    identifying, one or more remaining elements in a plurality of remaining elements of the hierarchical DOM after the removal of the one or more invisible elements and the first set of elements, that have one or more parent elements corresponding to one or more of the plurality of elements that have been removed from the hierarchical DOM;
    identifying one or more respective new parent elements of each of the plurality of remaining elements based on a role assigned to each of the plurality of remaining elements; and
    re-parenting each of the identified one or more remaining elements to one or more of the respective identified new parent elements remaining in the hierarchical DOM based at least in part on traversing the hierarchical DOM from each of the one or more remaining elements.

2. The method of claim 1, wherein parsing the plurality of elements in the hierarchical document object model comprises:
    storing a set of parameters defining elements that contain tabular data;
    parsing one or more data table elements in the plurality of elements, the one or more data table elements having one or more tags corresponding to a data table; and
    comparing the one or more data table elements with the set of parameters to determine whether each data table element contains tabular data.

3. The method of claim 2, wherein parsing the plurality of elements in the hierarchical document object model further comprises:

parsing one or more second data table elements in the plurality of elements, the one or more second data table elements having one or more second tags corresponding to a second data table;

comparing the one or more second data table elements with the set of parameters to determine whether each second data table element contains tabular data;

determining whether the data table and the second data table correspond to a single data table when the hierarchical DOM is rendered based on one or more of: (i) matching data elements between the one or more data table elements and the one or more second data table elements and (ii) a common parent element between the one or more data table elements and the one or more second data table elements; and merging the one or more data table elements and the one or more second data table elements based at least in part on a determination that each second data table element contains tabular data and a determination that the data table and the second data table correspond to a single data table when the hierarchical DOM is rendered, wherein merging comprises removing a parent second data table element in the one or more second data table elements and re-parenting the children of the removed parent second data table element to a parent data table element in the one or more data table elements.

4. The method claim 1, wherein removing the one or more invisible elements in the plurality of elements comprises, for each element:

determining whether the element is eligible for removal by comparing a tag of the element to a list of removable tags or a list of non-removable tags and comparing a tag of any child elements of the element to the list of removable tags or the list of non-removable tags;

determining whether the element is an invisible element based on one or more of: a display property of the element, a visibility property of the element, a height property of the element, or a width property of the element;

removing the element based at least in part on a determination that the element is eligible for removal and the element is an invisible element; and removing child elements of that element that inherit the display property of the element, the visibility property of the element, the height property of the element, or the width property of the element.

5. The method of claim 1, wherein removing each element in the first set of elements based at least in part on the one or more tags of each element in the plurality of elements comprises, for each element:

determining whether the element is eligible for removal based on one or more of: a tag of the element, a role assigned to the element, or a removal flag corresponding to the tag, the removal flag indicating whether elements having the tag are eligible for removal;

determining whether the element has an associated data value; and removing the element based at least in part on a determination that the element is eligible for removal.

6. The method of claim 1, further comprising:

assigning a respective role to each element in the plurality of elements based at least in part on a tag of the element and a dictionary mapping a plurality of tags to a plurality of roles;

determining whether a text conversion flag corresponding to each element in the one or more remaining elements is true or false; and reassigning each element having a text conversion flag that is true from the original role to a text role.

7. The method of claim 1, wherein re-parenting the one or more identified remaining elements to one or more of the identified new parent elements remaining in the hierarchical DOM based at least in part on traversing the hierarchical DOM from each of the one or more remaining elements comprises, for each remaining element in the one or more identified remaining elements:

storing a list of roles permitted to have child elements;

determining a new parent element for the remaining element by traversing the hierarchical DOM from the remaining element until a parent element of the remaining element is reached that has a role on the list of roles that are permitted to have child elements; and re-parenting the remaining element to the new parent element based at least in part on a determination that the parent element is permitted to have child elements.

8. An apparatus for transforming a hierarchical document object model (DOM) to filter non-rendered elements, the apparatus comprising:

one or more processors; and one or more memories operatively coupled to at least one of the one or more processors and having instructions stored thereon that, when executed by at least one of the one or more processors, cause at least one of the one or more processors to:

parse a plurality of elements in a hierarchical DOM to identify respective one or more tags of each element in the plurality of elements, each property, if any, of each element in the plurality of elements, and each value, if any, of each element in the plurality of elements;

determine one or more invisible elements in the plurality of elements based at least in part on one or more checks on each of the plurality of elements;

remove, from the hierarchical DOM, the one or more invisible elements in the plurality of elements, the one or more invisible elements being further determined based at least in part on one or more properties of each invisible element, each invisible element comprising an element of the hierarchical DOM that is hidden from a user when the hierarchical DOM is rendered;

determine a first set of elements in the plurality of elements based at least in part on comparing the one or more tags of each element in the plurality of elements against a list of tags that are eligible for removal;

remove, from the hierarchical DOM, each element in the first set of elements;

identify, one or more remaining elements in a plurality of remaining elements of the hierarchical DOM after the removal of the one or more invisible elements and the first set of elements, that have one or more parent elements corresponding to one or more of the plurality of elements that have been removed from the hierarchical DOM;

identify one or more respective new parent elements of each of the plurality of remaining elements based on a role assigned to each of the plurality of remaining elements; and re-parent each of the identified remaining elements to one or more of the respective identified new parent elements remaining in the hierarchical DOM based at least in part on traversing the hierarchical DOM from each of the one or more remaining elements.

9. The apparatus of claim 8, wherein the instructions that, when executed by at least one of the one or more processors, cause at least one of the one or more processors to parse the plurality of elements in the hierarchical document object model further cause at least one of the one or more processors to:

store a set of parameters defining elements that contain tabular data;

parse one or more data table elements in the plurality of elements, the one or more data table elements having one or more tags corresponding to a data table; and compare the one or more data table elements with the set of parameters to determine whether each data table element contains tabular data.

10. The apparatus of claim 9, wherein the instructions that, when executed by at least one of the one or more processors, cause at least one of the one or more processors to parse the plurality of elements in the hierarchical document object model further cause at least one of the one or more processors to:

parse one or more second data table elements in the plurality of elements, the one or more second data table elements having one or more second tags corresponding to a second data table;

compare the one or more second data table elements with the set of parameters to determine whether each second data table element contains tabular data;

determine whether the data table and the second data table correspond to a single data table when the hierarchical DOM is rendered based on one or more of: (i) matching data elements between the one or more data table elements and the one or more second data table elements and (ii) a common parent element between the one or more data table elements and the one or more second data table elements; and merge the one or more data table elements and the one or more second data table elements based at least in part on a determination that each second data table element contains tabular data and a determination that the data table and the second data table correspond to a single data table when the hierarchical DOM is rendered, wherein merging comprises removing a parent second data table element in the one or more second data table elements and re-parenting the children of the removed parent second data table element to a parent data table element in the one or more data table elements.

11. The apparatus of claim 8, wherein the instructions that, when executed by at least one of the one or more processors, cause at least one of the one or more processors to remove the one or more invisible elements in the plurality of elements further cause at least one of the one or more processors to, for each element:

determine whether the element is eligible for removal by comparing a tag of the element to a list of removable tags or a list of non-removable tags and comparing a tag of any child elements of the element to the list of removable tags or the list of non-removable tags;

determine whether the element is an invisible element based on one or more of: a display property of the element, a visibility property of the element, a height property of the element, or a width property of the element;

remove the element based at least in part on a determination that the element is eligible for removal and the element is an invisible element; and remove child elements of that element that inherit the display property of the element, the visibility property of the element, the height property of the element, or the width property of the element.

12. The apparatus of claim 8, wherein the instructions that, when executed by at least one of the one or more processors, cause at least one of the one or more processors to remove each element in the first set of elements based at least in part on the one or more tags of each element in the plurality of elements further cause at least one of the one or more processors to, for each element:

determine whether the element is eligible for removal based on one or more of: a tag of the element, a role assigned to the element, or a removal flag corresponding to the tag, the removal flag indicating whether elements having the tag are eligible for removal;

determine whether the element has an associated data value; and remove the element based at least in part on a determination that the element is eligible for removal.

13. The apparatus of claim 8, wherein at least one of the one or more memories has further instructions stored thereon that, when executed by at least one of the one or more processors, cause at least one of the one or more processors to:

assign a respective role to each element in the plurality of elements based at least in part on a tag of the element and a dictionary mapping a plurality of tags to a plurality of roles;

determine whether a text conversion flag corresponding to each element in the one or more remaining elements is true or false; and reassign each element having a text conversion flag that is true from the original role to a text role.

14. The apparatus of claim 8, wherein the instructions that, when executed by at least one of the one or more processors, cause at least one of the one or more processors to re-parent the one or more identified remaining elements to one or more of the identified new parent elements remaining in the hierarchical DOM based at least in part on traversing the hierarchical DOM from each of the one or more remaining elements further cause at least one of the one or more processors to, for each remaining element in the one or more identified remaining elements:

store a list of roles permitted to have child elements;

determine a new parent element for the remaining element by traversing the hierarchical DOM from the remaining element until a parent element of the remaining element is reached that has a role on the list of roles that are permitted to have child elements; and re-parent the remaining element to the new parent element based at least in part on a determination that the parent element is permitted to have child elements.

15. At least one non-transitory computer-readable medium storing computer-readable instructions that, when executed by one or more computing devices, cause at least one of the one or more computing devices to:

parse a plurality of elements in a hierarchical DOM to identify respective one or more tags of each element in the plurality of elements, any properties of each element in the plurality of elements, and any values of each element in the plurality of elements;

determine one or more invisible elements in the plurality of elements based at least in part on one or more checks on each of the plurality of elements;

remove, from the hierarchical DOM, the one or more invisible elements in the plurality of elements, the one or more invisible elements being further determined based at least in part on one or more properties of each invisible element, each invisible element comprising an element of the hierarchical DOM that is hidden from a user when the hierarchical DOM is rendered;

determine a first set of elements in the plurality of elements based at least in part on comparing the one or more tags of each element in the plurality of elements against a list of tags that are eligible for removal;

remove, from the hierarchical DOM, each element in the first set of elements;

identify one or more remaining elements in a plurality of remaining elements of the hierarchical DOM after the removal of the one or more invisible elements and the first set of elements, that have one or more parent elements corresponding to one or more of the plurality of elements that have been removed from the hierarchical DOM;

identify one or more respective new parent elements of each of the plurality of remaining elements based on a role assigned to each of the plurality of remaining elements; and re-parent each of the identified one or more remaining elements to one or more of the respective identified new parent elements remaining in the hierarchical DOM based at least in part on traversing the hierarchical DOM from each of the one or more remaining elements.

16. The at least one non-transitory computer-readable medium of claim 15, wherein the instructions that, when executed by at least one of the one or more computing devices, cause at least one of the one or more computing devices to parse the plurality of elements in the hierarchical document object model further cause at least one of the one or more computing devices to:

store a set of parameters defining elements that contain tabular data;

parse one or more data table elements in the plurality of elements, the one or more data table elements having one or more tags corresponding to a data table; and compare the one or more data table elements with the set of parameters to determine whether each data table element contains tabular data.

17. The at least one non-transitory computer-readable medium of claim 16, wherein the instructions that, when executed by at least one of the one or more computing devices, cause at least one of the one or more computing devices to parse the plurality of elements in the hierarchical document object model further cause at least one of the one or more computing devices to:

parse one or more second data table elements in the plurality of elements, the one or more second data table elements having one or more second tags corresponding to a second data table;

compare the one or more second data table elements with the set of parameters to determine whether each second data table element contains tabular data;

determine whether the data table and the second data table correspond to a single data table when the hierarchical DOM is rendered based on one or more of: (i) matching data elements between the one or more data table elements and the one or more second data table elements and (ii) a common parent element between the one or more data table elements and the one or more second data table elements; and merge the one or more data table elements and the one or more second data table elements based at least in part on a determination that each second data table element contains tabular data and a determination that the data table and the second data table correspond to a single data table when the hierarchical DOM is rendered, wherein merging comprises removing a parent second data table element in the one or more second data table elements and re-parenting the children of the removed parent second data table element to a parent data table element in the one or more data table elements.

18. The at least one non-transitory computer-readable medium of claim 15, wherein the instructions that, when executed by at least one of the one or more computing devices, cause at least one of the one or more computing devices to remove the one or more invisible elements in the plurality of elements further cause at least one of the one or more computing devices to, for each element:

determine whether the element is eligible for removal by comparing a tag of the element to a list of removable tags or a list of non-removable tags and comparing a tag of any child elements of the element to the list of removable tags or the list of non-removable tags;

determine whether the element is an invisible element based on one or more of: a display property of the element, a visibility property of the element, a height property of the element, or a width property of the element;

remove the element based at least in part on a determination that the element is eligible for removal and the element is an invisible element; and remove child elements of that element that inherit the display property of the element, the visibility property of the element, the height property of the element, or the width property of the element.

19. The at least one non-transitory computer-readable medium of claim 15, wherein the instructions that, when executed by at least one of the one or more computing devices, cause at least one of the one or more computing devices to remove each element in the first set of elements based at least in part on the one or more tags of each element in the plurality of elements further cause at least one of the one or more computing devices to, for each element:

determine whether the element is eligible for removal based on one or more of: a tag of the element, a role assigned to the element, or a removal flag corresponding to the tag, the removal flag indicating whether elements having the tag are eligible for removal;

determine whether the element has an associated data value; and remove the element based at least in part on a determination that the element is eligible for removal.

20. The at least one non-transitory computer-readable medium of claim 15, further storing computer-readable instructions that, when executed by at least one of the one or more computing devices, cause at least one of the one or more computing devices to:

assign a respective role to each element in the plurality of elements based at least in part on a tag of the element and a dictionary mapping a plurality of tags to a plurality of roles;

determine whether a text conversion flag corresponding to each element in the one or more remaining elements is true or false; and reassign each element having a text conversion flag that is true from the original role to a text role.

21. The at least one non-transitory computer-readable medium of claim 15, wherein the instructions that, when executed by at least one of the one or more computing devices, cause at least one of the one or more computing devices to re-parent the one or more identified remaining elements to the one or more of the identified new parent elements remaining in the hierarchical DOM based at least in part on traversing the hierarchical DOM from each of the one or more remaining elements further cause at least one of the one or more computing devices to, for each remaining element in the one or more identified remaining elements:
    store a list of roles permitted to have child elements;
    determine a new parent element for the remaining element by traversing the hierarchical DOM from the remaining element until a parent element of the remaining element is reached that has a role on the list of roles that are permitted to have child elements; and
    re-parent the remaining element to the new parent element based at least in part on a determination that the parent element is permitted to have child elements.

* * * * *